(12) United States Patent
Gjikokaj et al.

(10) Patent No.: US 9,656,677 B2
(45) Date of Patent: May 23, 2017

(54) METHOD AND DEVICE FOR ASCERTAINING A DRIVER STATE

(71) Applicant: Robert Bosch GmbH, Stuttgart (DE)

(72) Inventors: Dijanist Gjikokaj, Weinsberg (DE); Martin Rous, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/436,820

(22) PCT Filed: Oct. 23, 2013

(86) PCT No.: PCT/EP2013/072137
§ 371 (c)(1),
(2) Date: Apr. 17, 2015

(87) PCT Pub. No.: WO2014/064136
PCT Pub. Date: May 1, 2014

(65) Prior Publication Data
US 2016/0167670 A1    Jun. 16, 2016

(30) Foreign Application Priority Data

Oct. 25, 2012   (DE) ........................ 10 2012 219 508

(51) Int. Cl.
| | |
|---|---|
| *G01M 17/00* | (2006.01) |
| *B60W 40/08* | (2012.01) |
| *B60K 28/06* | (2006.01) |
| *G08B 21/06* | (2006.01) |
| *B60W 40/09* | (2012.01) |

(52) U.S. Cl.
CPC ............. *B60W 40/08* (2013.01); *B60K 28/06* (2013.01); *B60W 40/09* (2013.01); *G08B 21/06* (2013.01); *B60W 2040/0872* (2013.01)

(58) Field of Classification Search
CPC ... A61B 3/113; G06K 9/00832; B60W 10/20; B60W 40/08
USPC ........... 701/29.1, 29.6, 36, 41; 340/439, 575
See application file for complete search history.

(56) References Cited

U.S. PATENT DOCUMENTS

| | | | |
|---|---|---|---|
| 6,313,749 | B1 | 11/2001 | Horne et al. |
| 6,366,207 | B1 | 4/2002 | Murphy |
| 8,096,946 | B2 * | 1/2012 | Burton ............... A61B 5/18 |
| | | | 340/575 |
| 2005/0219057 | A1 | 10/2005 | Ihara et al. |

(Continued)

FOREIGN PATENT DOCUMENTS

| | | |
|---|---|---|
| CN | 101169873 A | 4/2008 |
| DE | 10 2009 004487 | 7/2010 |

OTHER PUBLICATIONS

International Search Report for PCT/EP2013/072137, dated Mar. 4, 2013.

*Primary Examiner* — Gertrude Arthur Jeanglaud
(74) *Attorney, Agent, or Firm* — Norton Rose Fulbright US LLP; Gerard A. Messina

(57) ABSTRACT

A variable that represents at least the alertness of the driver in a current vehicle operating cycle is ascertained as a function of at least one of (i) the variable representing the alertness of the driver determined in a preceding vehicle operating cycle, and (ii) at least one value used for ascertaining the variable representing the alertness of the driver determined in a preceding vehicle operating cycle.

18 Claims, 1 Drawing Sheet

(56) References Cited

U.S. PATENT DOCUMENTS

2006/0011399 A1* 1/2006 Brockway ............... A61B 5/18
　　　　　　　　　　　　　　　　　　　　　　180/272
2014/0358376 A1* 12/2014 Phelan ................. B60W 10/18
　　　　　　　　　　　　　　　　　　　　　　701/41

* cited by examiner

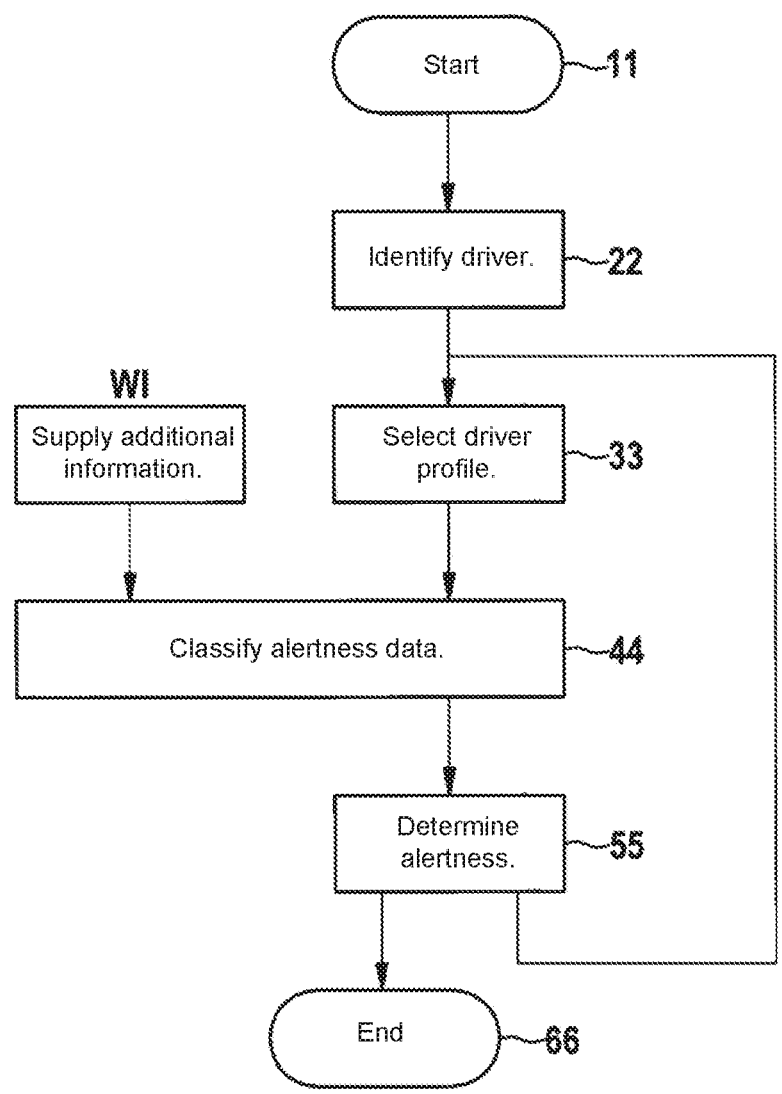

METHOD AND DEVICE FOR ASCERTAINING A DRIVER STATE

BACKGROUND OF THE INVENTION

1. Field of the Invention

The present invention relates to a method and a device for ascertaining a state of a driver of a vehicle.

2. Description of the Related Art

Methods for ascertaining the state of a driver of a vehicle are known from the U.S. Pat. No. 6,313,749 B1.

BRIEF SUMMARY OF THE INVENTION

The present invention is based on a method for ascertaining a variable that represents the state of a driver of a vehicle; the variable representing the state of the driver is a variable that represents at least the alertness of the driver, which is ascertained as a function of at least the variable determined in a preceding vehicle operating cycle, and/or as a function of at least one value used for ascertaining the variable and determined in a preceding vehicle operating cycle.

An object of the present invention is to make the determination of the state of the driver driver-specific and thus more reliable in that a value that was determined in a preceding vehicle operating cycle is employed for ascertaining the variable.

In one advantageous development of the present invention, the variable representing the alertness of the driver is ascertained via another variable, which represents the activation level.

When ascertaining the variable representing the alertness, a tonic and a phaseal component are preferably taken into account.

A neural network and/or a classifier are/is advantageously used when determining the variable representing the alertness.

According to one advantageous development of the present invention, an identification of the driver is made at the start of a vehicle operating cycle.

When ascertaining the variable representing the alertness, the driving behavior, especially the lateral control behavior and/or the ability of the driver to keep the vehicle within a traffic lane as much as possible, are advantageously taken into consideration.

When ascertaining the variable representing the alertness, the driving behavior, especially the actuation of operating elements by the driver, and/or the interaction of the driver with the vehicle via HMI and/or infotainment systems, is preferably considered.

When ascertaining the variable representing the alertness, a quantity that represents the physiological state of the driver is advantageously considered.

According to one advantageous development of the present invention, the body temperature and/or the heart beat frequency of the driver and/or the pupil dilation of the driver are/is taken into account when ascertaining the variable representing the physiological state of the driver.

Driving information is preferably considered when ascertaining the variable representing the alertness.

The driving information advantageously is the already elapsed driving time and/or the brightness to which the driver is exposed, and/or the chronological time and/or the temperature to which the driver is exposed.

Preferably, a device is used for ascertaining a variable that represents a state of a driver, this variable representing a state of the driver being a variable that represents at least the alertness of the driver, which is ascertained as a function of at least the variable determined in a preceding vehicle operating cycle and/or as a function of at least one value used for ascertaining the variable, which was determined in a preceding vehicle operating cycle.

In the following text, the present invention will be discussed on the basis of an exemplary embodiment from which additional inventive features may result, but to which the present invention is not restricted in its scope. The details are shown in the drawing.

BRIEF DESCRIPTION OF THE DRAWING

FIG. 1 shows a schematic representation of the ascertaining of an activation level of a driver of a vehicle.

DETAILED DESCRIPTION OF THE INVENTION

FIG. 1 illustrates the ascertaining of the level of activeness (alertness) of the driver of a vehicle in a schematic manner. Method step 11 initiates the process of ascertaining the activation level. In an identification step 22, the identification of the driver of a vehicle is carried out. With the aid of the identification of the driver of a vehicle, a driver profile is selected in method step 33. The driver profile includes information about the driver, especially with regard to the activation level of the driver during the preceding vehicle operating cycle. The information about the driver profile is forwarded to a classifier in classification step 44.

In addition to information from the driver profile, additional information WI is supplied to the classifier. This additional information WI is information about the behavior of a driver of a vehicle and/or the circumstances of the trip and/or the physiological state of the driver of the vehicle. With the aid of the classification carried out in method step 44, an activeness (alertness) level of the driver is ascertained in method step 55. The activeness (alertness) level is added to the individual driver profile. The method for ascertaining the activeness (alertness) level of a driver of a vehicle is concluded by method step 66.

What is claimed is:

1. A method for ascertaining a variable representing at least an alertness of a driver, the method comprising:
   identifying the driver;
   retrieving a profile of the driver, the profile including at least one of: the variable representing at least the alertness of the driver determined in a preceding vehicle operating cycle, or at least one value used for ascertaining the variable representing at least the alertness of the driver in the preceding vehicle operating cycle; and
   ascertaining, for a current vehicle operating cycle, the variable representing at least the alertness of the driver as a function of the at least one of: the variable representing at least the alertness of the driver determined in the preceding vehicle operating cycle, or the at least one value used for ascertaining the variable representing at least the alertness of the driver in the preceding vehicle operating cycle.

2. The method as recited in claim 1, wherein the variable representing at least the alertness of the driver for the current vehicle operating cycle is determined additionally as a function of a further variable which represents a level of activeness of the driver.

3. The method as recited in claim 1, wherein the ascertaining the variable representing at least the alertness of the driver uses at least one of: a neural network, or a classifier.

4. The method as recited in claim 1, wherein the identifying the driver is performed at a start of the current vehicle operating cycle.

5. The method as recited in claim 1, wherein the ascertaining the variable representing at least the alertness of the driver is further a function of at least one of: a behavior of the driver to perform lateral control of the vehicle, or a performance of the driver to keep the vehicle inside a traffic lane.

6. The method as recited in claim 1, wherein the ascertaining the variable representing at least the alertness of the driver is further a function of at least one of: an actuation of an operating element by the driver, or an interaction of the driver with the vehicle via at least one of a human-machine-interface or an infotainment system.

7. The method as recited in claim 1, wherein the ascertaining the variable representing at least the alertness of the driver is further a function of a variable representing a physiological state of the driver.

8. The method as recited in claim 7, wherein the variable representing the physiological state of the driver includes at least one of: a body temperature, a heartbeat frequency, or a pupil dilation.

9. The method as recited in claim 1, wherein the ascertaining the variable representing at least the alertness of the driver is further a function of driving information.

10. The method as recited in claim 9, wherein the driving information includes at least one of: an already elapsed driving time, a brightness to which the driver is exposed, a time of a day, or a temperature to which the driver is exposed.

11. The method as recited in claim 1, further comprising storing the ascertained variable representing at least the alertness of the driver for the current operating cycle in the driver profile.

12. The method as recited in claim 1, further comprising:
receiving additional information related to at least one of: the driver, or a trip,
wherein the ascertaining the variable representing at least the alertness of the driver is further a function of the additional information.

13. A device for ascertaining a variable representing at least an alertness of the driver, the device comprising:
a control unit including a processor configured to perform the following:
identifying the driver;
retrieving a profile of the driver, the profile including at least one of: the variable representing at least the alertness of the driver determined in a preceding vehicle operating cycle, or at least one value used for ascertaining the variable representing at least the alertness of the driver in the preceding vehicle operating cycle; and
ascertaining, for a current vehicle operating cycle, the variable representing at least the alertness of the driver as a function of the at least one of: the variable representing at least the alertness of the driver determined in the preceding vehicle operating cycle, or the at least one value used for ascertaining the variable representing at least the alertness of the driver in the preceding vehicle operating cycle.

14. The device as recited in claim 13, wherein the ascertaining the variable representing at least the alertness of the driver is further a function of at least one of: a behavior of the driver to perform lateral control of the vehicle, or a performance of the driver to keep the vehicle inside a traffic lane.

15. The device as recited in claim 13, wherein the ascertaining the variable representing at least the alertness of the driver is further a function of at least one of: an actuation of an operating element by the driver, or an interaction of the driver with the vehicle via at least one of a human-machine-interface or an infotainment system.

16. The device as recited in claim 13, wherein the ascertaining the variable representing at least the alertness of the driver is further a function of a variable representing a physiological state of the driver, the variable representing the physiological state of the driver including at least one of: a body temperature, a heartbeat frequency, or a pupil dilation.

17. The device as recited in claim 13, wherein the ascertaining the variable representing at least the alertness of the driver is further a function of driving information, the driving information including at least one of: an already elapsed driving time, a brightness to which the driver is exposed, a time of a day, or a temperature to which the driver is exposed.

18. The device as recited in claim 13, wherein the processor is configured to store the ascertained variable representing at least the alertness of the driver for the current operating cycle in the driver profile.

* * * * *